US012134344B2

(12) United States Patent
Benamar

(10) Patent No.: US 12,134,344 B2
(45) Date of Patent: *Nov. 5, 2024

(54) METHOD FOR CONTROLLING A MOTOR VEHICLE LIGHTING SYSTEM

(71) Applicant: VALEO VISION, Bobigny (FR)

(72) Inventor: Fatima Benamar, Bobigny (FR)

(73) Assignee: Valeo Vision, Bobigny (FR)

(*) Notice: Subject to any disclaimer, the term of this patent is extended or adjusted under 35 U.S.C. 154(b) by 156 days.

This patent is subject to a terminal disclaimer.

(21) Appl. No.: 17/790,548

(22) PCT Filed: Dec. 4, 2020

(86) PCT No.: PCT/EP2020/084762
§ 371 (c)(1),
(2) Date: Jul. 1, 2022

(87) PCT Pub. No.: WO2021/122071
PCT Pub. Date: Jun. 24, 2021

(65) Prior Publication Data
US 2023/0042933 A1 Feb. 9, 2023

(30) Foreign Application Priority Data
Dec. 16, 2019 (FR) ..................... 1914490

(51) Int. Cl.
*B60Q 1/04* (2006.01)
*B60Q 1/14* (2006.01)
(Continued)

(52) U.S. Cl.
CPC ............. *B60Q 1/143* (2013.01); *F21S 41/65* (2018.01); *B60Q 2300/056* (2013.01); *F21W 2102/145* (2018.01); *F21Y 2115/10* (2016.08)

(58) Field of Classification Search
CPC ........ B60Q 1/10; B60Q 1/143; B60Q 1/1423; B60Q 2300/324; B60Q 2300/41;
(Continued)

(56) References Cited

U.S. PATENT DOCUMENTS 6,144,158 A 11/2000 Beam
9,381,852 B2 7/2016 Foltin
(Continued)

FOREIGN PATENT DOCUMENTS

DE 102011006570 A1 10/2012
DE 102011050535 A1 11/2012
(Continued)

OTHER PUBLICATIONS

European Patent Office, International Search Report and Written Opinion (with English translations) of corresponding International Application No. PCT/EP2020/084762, dated Jan. 14, 2021.
(Continued)

*Primary Examiner* — Thai Pham
(74) *Attorney, Agent, or Firm* — Valeo Vision

(57) ABSTRACT

A method for controlling a lighting system of a host motor vehicle with a plurality of selectively controllable elementary light sources, each able to emit an elementary light beam with the vertical angular opening of which is less than 1°. The method includes detecting a target object by a sensor system. Determining a vertical angle between a given point of the sensor system of the host vehicle and a detected point of the target object. Determining, from the vertical angle, a lower angle and an upper angle between a given point of the lighting system and, respectively, an upper cut-off and a lower cut-off intended to together vertically border the target object. Controlling the elementary light sources to emit a pixelated road light beam, as a function of the lower and upper angles, to generate, in the light beam, a dark area extending substantially between the upper and lower cut-offs.

10 Claims, 4 Drawing Sheets

(51) Int. Cl.
*F21S 41/65* (2018.01)
*F21W 102/145* (2018.01)
*F21Y 115/10* (2016.01)

(58) Field of Classification Search
CPC ......... B60Q 2300/42; B60Q 2300/056; F21W 2102/14; F21W 2102/145; F21W 2102/155
See application file for complete search history.

(56) References Cited

U.S. PATENT DOCUMENTS

| | | | |
|---|---|---|---|
| 10,654,402 | B2 | 5/2020 | Kambara |
| 2014/0219506 | A1* | 8/2014 | Foltin ............... B60Q 1/143 |
| | | | 382/104 |
| 2014/0355827 | A1 | 12/2014 | Ogawa |
| 2016/0152174 | A1* | 6/2016 | Hagisato ............ B60Q 1/1438 |
| | | | 362/466 |
| 2019/0225139 | A1* | 7/2019 | Kambara ............ B60Q 1/143 |

FOREIGN PATENT DOCUMENTS

| | | | |
|---|---|---|---|
| EP | 2700537 | A1 | 2/2014 |
| EP | 3517362 | A1 | 7/2019 |
| JP | 2015214281 | A * | 12/2015 |
| JP | 2019127125 | A | 8/2019 |
| WO | 2014184634 | A2 | 11/2014 |

OTHER PUBLICATIONS

Japanese Patent Office, Office Action of corresponding Japanese Patent Application No. 2022-536888, dated Apr. 28, 2023.

* cited by examiner

METHOD FOR CONTROLLING A MOTOR VEHICLE LIGHTING SYSTEM

CROSS-REFERENCE TO RELATED APPLICATIONS

This application is filed under 35 U.S.C. § 371 U.S. National Phase of International Application No. PCT/EP2020/084762 filed Dec. 4, 2020 (published as WO2021122071), which claims priority benefit to French application No. 1914490 filed on Dec. 16, 2019, the disclosures of which are herein incorporated by reference in their entirety.

TECHNICAL FIELD

The invention relates to the field of motor-vehicle lighting. More specifically, the invention relates to a method of controlling a lighting system of a motor vehicle to produce a non-dazzling pixelated high light beam.

BACKGROUND OF THE INVENTION

It is known practice to equip motor vehicles with a sensor system for detecting a target object on the road not to be dazzled and with a lighting system for emitting a non-dazzling beam as a function of the position of this object.

BRIEF SUMMARY OF THE INVENTION

To that end, these lighting systems are capable of emitting a horizontally segmented road-illuminating beam and are provided with a control unit capable of switching on and/or switching off and/or modifying the light intensity of each of the elementary light beams forming the segments of this beam. It is thus known practice to control this type of lighting system so as to turn off a light segment, extending vertically over the entirety of illuminating beam, centered at the level of the target object. Such lighting systems are thus able to illuminate the road more substantially than a conventional low illuminating beam without dazzling other road users.

However, the technologies of recent lighting systems make it possible to emit a pixelated beam horizontally and vertically whose vertical resolution is particularly high. For this type of technology, there is an interest in controlling the lighting system so as to create a pixelated road-illuminating beam that features a dark region at the level of the target object while leaving light above and below this dark region. Specifically, such a pixelated illuminating beam, unlike a beam controlled in a segmented manner, would allow the driver to perceive gantry-type traffic signs or to perceive objects on the road or road markings in the near field, or the driver not to be disturbed as the dark region moves in the illuminating beam to track the target object as it moves.

There is thus a need for a method that makes it possible to control the creation of this dark region in such a pixelated beam such that it has upper and lower cut-offs bordering the target object while leaving light above and below this target object. The present invention aims to address this need.

To those ends, one subject of the invention is a method for controlling a lighting system of a host motor vehicle, the lighting system comprising a plurality of selectively controllable elementary light sources each able to emit an elementary light beam whose vertical angular aperture is smaller than 1°, the method comprising the following steps:

Detecting a target object by means of a sensor system of the host vehicle;

Determining a vertical angle between a given point of the sensor system of the host vehicle and a detected point of the target object;

Determining, from the vertical angle, a lower angle and an upper angle between a given point of the lighting system of the host vehicle and, respectively, an upper cut-off and a lower cut-off intended to together vertically border the target object;

Controlling the elementary light sources of the lighting system of the host vehicle to emit a pixelated high light beam, some of the elementary light sources being controlled, as a function of said lower and upper angles, to generate, in the light beam, a dark region extending substantially between the upper and lower cut-offs.

It is understood that by virtue of the invention, it is possible to turn off certain pixels in a pixelated light beam emitted by the lighting system of the host vehicle so as to form a dark region whose upper and lower cut-offs frame or border the target object, the positions of these cut-offs being defined based on information relating to the vertical positioning of the target object with respect to the host vehicle.

Advantageously, the step of detecting the target object comprises detecting a light source of the target object, the detected point being a point of said light source. For example, the sensor system of the host vehicle comprises a camera and a computer that is designed to implement one or more methods for processing the images acquired by said camera so as to detect a light source of the target object. It could, for example, be a headlight or a taillight of a target motor vehicle.

Preferably, the method comprises an intermediate step of comparing the vertical angle with a lower threshold and an upper threshold, the execution of the step of determining the lower and upper angles being conditional on the vertical angle being between the lower threshold and the upper threshold. The lower threshold may, for example, be an angle greater than −1°, and in particular be equal to −0.7°. The upper threshold may, for example, be an angle smaller than +5°, and in particular be equal to +4.8°. This comparison step originates in that adaptive road-illuminating functions can be activated only when the host vehicle is traveling at a sufficiently high speed. However, it has been observed that, given the slopes of roads on which motor vehicles are liable to travel at high speed, the angle between the light system of the host vehicle and an upper point of the rear window of a target vehicle in front cannot be smaller than 1° or greater than 5°. Consequently, it is not necessary to generate a dark region in the pixelated light beam when the vertical angle is not within the range of the lower and upper thresholds, since the host vehicle cannot in this case drive at sufficient speed to allow the adaptive road-illuminating function to be activated.

Advantageously, the step of determining said vertical angle is a step of determining a vertical angle between said given point of the sensor system of the host vehicle and said detected point of the target object at a given time, the method comprising a step of predicting a value of said vertical angle at a future time with respect to the given time. The given time may, for example, correspond to the time of detection of the target object by the sensor system, and the lower and upper angles may be determined from the predicted value of said vertical angle. This feature makes it possible to compensate for the latency in the sensor and lighting systems of the motor vehicle. Specifically, between the given time when the target object was detected by the sensor system and the time when the dark region is created in the light beam emitted by the lighting system, the target object may have moved such that the dark region no longer substantially borders it and so it may be dazzled by the light beam. Predicting the value of the vertical angle at a future time thus makes it possible to position the upper and lower cut-offs of the dark region at the position of the target object at this future time.

Where applicable, the prediction step may comprise a step of determining a vertical angular velocity of the target object, the prediction of the value of the vertical angle at a future time being carried out using the vertical angular velocity of the target object. For example, the vertical angular velocity may be determined by deriving the value of the vertical angle over time.

In one embodiment of the invention, the step of determining a vertical angle comprises a step of determining the distance separating the host vehicle and the target object, the value of the lower angle being determined by means of said determined distance. For example, the distance separating the host vehicle and the target object may be obtained by means of a method for processing the images acquired by the camera of the host vehicle, implemented by the computer of the sensor system. Advantageously, the value of the lower angle may be obtained by transforming the vertical angle by changing from a reference frame centered on the sensor system of the host vehicle to a reference frame centered on the lighting system of the host vehicle. For example, the value of the lower angle may be determined using the following equation:

$$V_{inf} = \tan^{-1}\left(\frac{\tan(\alpha) \cdot D_{HC} \cdot \cos(\alpha) + (H_{cam} - H_{HL})}{D_{HC} \cdot \cos(\alpha) - D_{capot}}\right) \quad \text{Math 1}$$

Where $V_{lower}$ is the lower angle, $\alpha$ the value of the vertical angle, $D_{HC}$ the distance separating the host vehicle and the target object, $H_{cam}$ the height of the sensor system of the host vehicle with respect to the road, $H_{HL}$ the height of the lighting system of the host vehicle with respect to the road and $D_{capot}$ the distance separating the sensor system from the lighting system, such as the length of the hood of the host vehicle.

It will be understood that the above equation makes it possible in particular to position the low cut-off of the dark region substantially at the detected point of the target object, such as a headlight or a taillight of a target vehicle. If desired, the value of the lower angle may be obtained by transforming the vertical angle through said change in reference frame from which a predetermined margin is subtracted. In this way, it is possible to position the cut-off below said detected point, for example at the level of a sill of a target vehicle.

Advantageously, the step of determining a vertical angle comprises a step of determining the height of the target object, the value of the upper angle being determined by means of the value of the lower angle and said determined height.

Advantageously, the step of detecting the target object comprises classifying the type of the target object among a set of predetermined target object types, and the height of the target object is determined as a function of the classified target object type. For example, the type of the object may be obtained by means of a method for recognizing the shape of the target object based on the images acquired by the camera of the host vehicle, implemented by the computer of the sensor system. Where applicable, the set of predetermined target object types may in particular comprise a pedestrian, a bicycle, a car or a truck, each predetermined target object type being associated with a predetermined target object height.

As a variant, the height of the target object may be obtained by means of a method for processing the images acquired by the camera of the host vehicle, implemented by the computer of the sensor system.

For example, the value of the upper angle may be determined using the following equation:

$$V_{sup} = \tan^{-1}\left(\frac{H_C - H_{HL})}{D_{HC} \cdot \cos(\alpha) - D_{capot}}\right) + V_{inf} \quad \text{Math 2}$$

Where $V_{sup}$ is the upper angle, $\alpha$ the value of the vertical angle, $D_{HC}$ the distance separating the host vehicle and the target object, $H_C$ the height of the target object, $H_{HL}$ the height of the lighting system of the host vehicle with respect to the road, $V_{inf}$ the value of the lower angle and Dcapot the distance separating the sensor system from the lighting system, such as, for example, the length of the hood of the host vehicle.

Advantageously, the step of controlling the elementary light sources of the lighting system of the host vehicle comprises turning off some elementary light sources each capable of emitting an elementary light beam between the upper and lower cut-offs. For example, since each elementary light source is able to emit a light beam with a given emission cone, defined by its given angular aperture and its direction of emission, the control step may comprise a step of selecting the elementary light sources whose emission cones are vertically at least partially within the interval defined by the lower and upper angles. Where applicable, the step of controlling the elementary light sources may comprise turning off some elementary light sources each capable of emitting an elementary light beam between the upper and lower cut-offs and between lateral cut-offs bordering the target object. For example, it will be possible to determine, from a lateral angle between a given point of the sensor system and a detected point of the target object, two lateral angles between a given point of the lighting system and a left and right lateral cut-off, respectively, intended to laterally border the target object.

Another subject of the invention is a motor vehicle comprising a sensor system, a lighting system and a controller, the controller being designed to implement the method according to the invention.

Advantageously, the lighting system comprises a plurality of selectively controllable elementary light sources each able to emit an elementary light beam whose vertical angular aperture is smaller than 1°. Where applicable, all of the elementary light sources may be able to emit a pixelated light beam that extends vertically in a range from −1° to +5° around the horizon.

Advantageously, the elementary light sources are arranged such that the vertical angular aperture of the elementary light beams that they are able to emit increases toward the top of the pixelated light beam. If desired, the lighting system may comprise:

a first plurality of selectively controllable elementary light sources, each able to emit an elementary light beam whose vertical angular aperture is substantially 0.25°, all of the sources of the first plurality of elementary light sources being able to emit a first pixelated light sub-beam extending vertically in a range from −1° to +1°;

a second plurality of selectively controllable elementary light sources, each able to emit an elementary light beam whose vertical angular aperture is substantially 0.3°, all of the sources of the second plurality of elementary light sources being able to emit a second pixelated light sub-beam extending vertically in a range from +1° to +2°;

a third plurality of selectively controllable elementary light sources, each able to emit an elementary light beam whose vertical angular aperture is substantially 0.35°, all of the sources of the third plurality of elementary light sources being able to emit a third pixelated light sub-beam extending vertically in a range from +2° to +3°;

a fourth plurality of selectively controllable elementary light sources, each able to emit an elementary light beam whose vertical angular aperture is substantially 0.4°, all of the sources of the fourth plurality of elementary light sources being able to emit a fourth pixelated light sub-beam extending vertically in a range from +3° to +5°.

In one embodiment of the invention, the lighting system comprises a light module comprising a pixelated light source comprising a plurality of elementary emitters arranged in a matrix array, each of the elementary emitters forming an elementary light source and being able to be activated selectively so as to emit one elementary light beam; and a projecting optical element associated with said pixelated light source for projecting each of said elementary light beams onto the road. For example, the pixelated light source comprises at least one matrix array of light-emitting elements (called a monolithic array), and in particular at least one monolithic matrix array of light-emitting elements, also called a monolithic array.

As a variant, the light module may comprise a light source formed, for example, of at least one light-emitting diode and of a matrix array of optoelectronic elements, a digital micromirror device (DMD) for example, that directs the light rays output from said at least one light source by reflection toward a projecting optical element.

BRIEF DESCRIPTION OF THE DRAWINGS

The present invention will now be described by way of examples that are only illustrative and that in no way limit the scope of the invention, and with reference to the accompanying illustrations, in which.

DETAILED DESCRIPTION OF THE INVENTION

In the following description, elements that are identical in terms of structure or in terms of function and that appear in various figures have been designated with the same reference, unless otherwise indicated.

Figure 1:
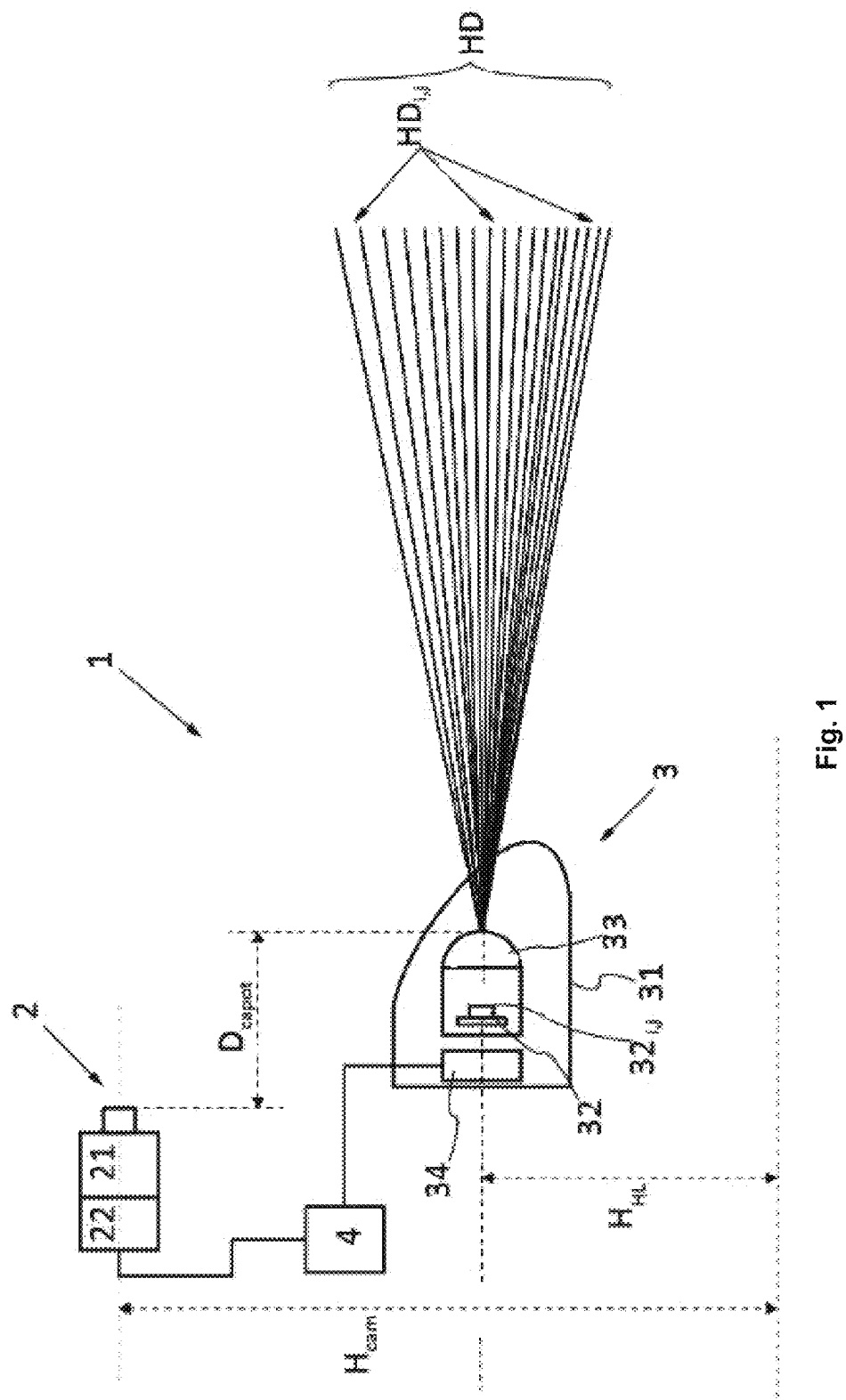
FIG. 1 shows, schematically and partially, a motor vehicle according to one embodiment of the invention.

FIG. 1 shows a partial view of a host motor vehicle 1 according to one embodiment of the invention. The host motor vehicle 1 comprises a sensor system 2 comprising a camera 21, for example arranged at the level of an interior rear-view mirror of the vehicle 1 so as to be able to acquire images of the road ahead of the vehicle 1, and a computer 22 designed to implement various methods for processing these images. The host vehicle 1 also comprises a lighting system 3 comprising a light module 31, for example arranged in a headlight of the vehicle 1. The light module 31 comprises in particular a pixelated light source 32 associated with a lens 33. In the example described, the pixelated light source 32 is a monolithic pixelated light-emitting diode, each of the light-emitting elements of which forms an elementary light source $32_{i,j}$ that is able to be selectively activated and controlled by an integrated controller so as to emit light toward the lens 33, which thus projects an elementary light beam $HD_{i,j}$, the light intensity of which is able to be controlled, onto the road. Each elementary light beam $HD_{i,j}$ is projected by the lens in a given emission cone, defined by a given direction of emission and a given angular aperture. Thus, in the example described, all of the elementary light beams $HD_{i,j}$ thus form a pixelated light beam HD featuring 500 pixels distributed over 25 columns and 20 rows, extending vertically over an angular vertical range from −1° to +5°, each pixel of which is formed by one of these elementary light beams $HD_{i,j}$.

Each elementary light beam $HD_{i,j}$ emitted by one of the elementary light sources $32_{i,j}$ of the source 32 has a vertical aperture smaller than 1°. More specifically, the elementary light sources $32_{i,j}$ of the source 32 are arranged such that the vertical angular aperture of the elementary light beams $HD_{i,j}$ that they are able to emit increases toward the top of the pixelated light beam. In particular:

Each of the elementary light sources whose emission cone belongs to the angular vertical range from −1° to +1° is able to emit an elementary light beam whose vertical angular aperture is substantially 0.25°;

Each of the elementary light sources whose emission cone belongs to the angular vertical range from +1° to +2° is able to emit an elementary light beam whose vertical angular aperture is substantially 0.3°;

Each of the elementary light sources whose emission cone belongs to the angular vertical range from +2° to +3° is able to emit an elementary light beam whose vertical angular aperture is substantially 0.35°;

Each of the elementary light sources whose emission cone belongs to the angular vertical range from +3° to +5° is able to emit an elementary light beam whose vertical angular aperture is substantially 0.4°.

The light module 31 comprises a controller 34 designed to control the integrated controller of the pixelated light source 32 so as to selectively control the turning on, the turning off and the modification of the light intensity of each of the elementary light beams $HD_{i,j}$ as a function of instructions received from a controller 4 of the host vehicle 1, these instructions being in particular determined based on the information provided by the computer 22 of the sensor system 2 of the host vehicle.

It will be noted that, in the example described, the camera 21 is located at a height $H_{cam}$ and the light module 31 is located at a height $H_{HL}$, these heights being measured with respect to the road on which the host vehicle 1 is traveling. Furthermore, the camera 21 and the light module 31 are separated by a distance $D_{capot}$.

Figure 2:
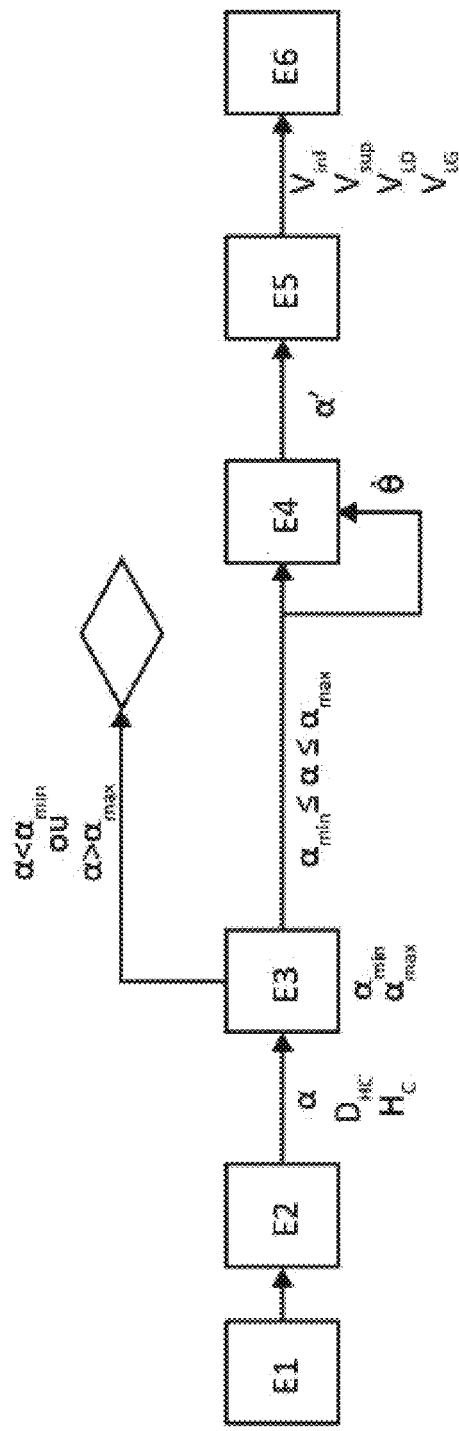
FIG. 2 shows a method according to one embodiment of the invention, implemented by the motor vehicle of FIG. 1.
Figure 3:
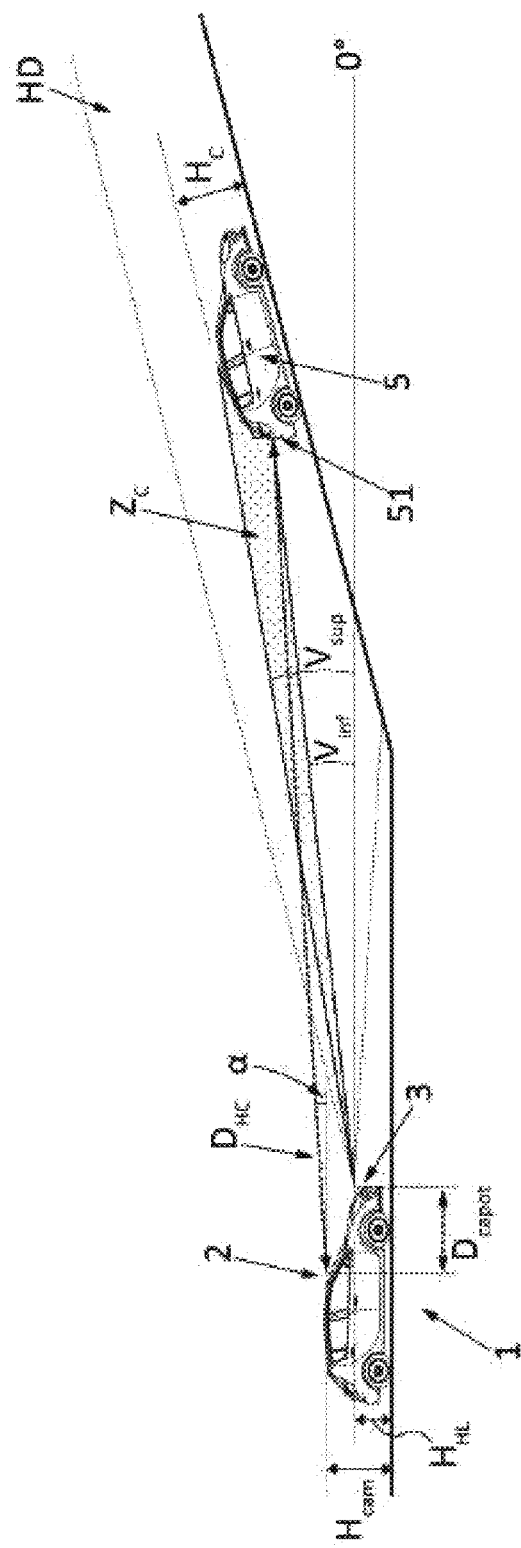
FIG. 3 shows a side view of a road scene during the implementation of the method of FIG. 2 by the vehicle of FIG. 1.
Figure 4:
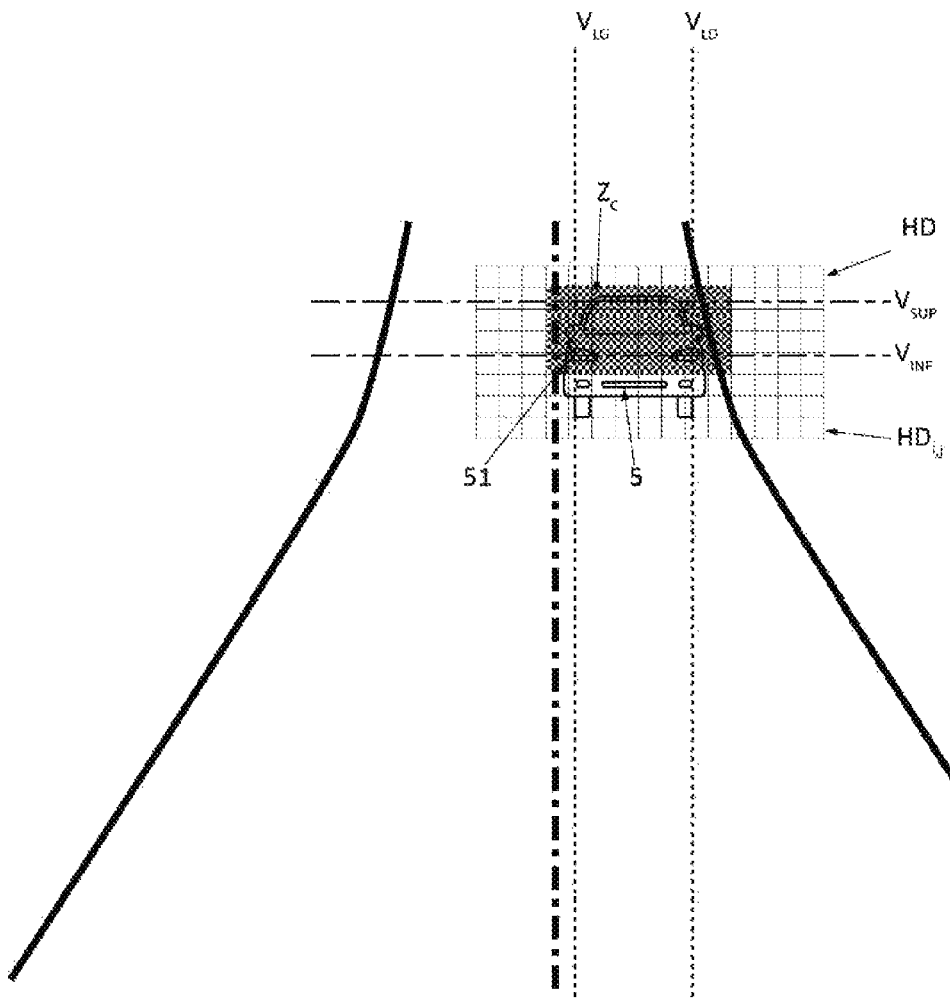
FIG. 4 shows a front view of a road scene during the implementation of the method of FIG. 2 by the vehicle of FIG. 1.

FIG. 2 shows a method for controlling the lighting system 3 of the host vehicle 1 that allows the lighting system 3 to emit a high light beam that is non-dazzling for a target object 5, implemented by the controller 4, and using the sensor system 2. FIG. 3 and FIG. 4 show side and front views of the road scene onto which this light beam is projected during the implementation of this method. It should be noted that these FIG. 3 and FIG. 4 show only partial views of this light beam.

In a first step E1, the sensor system 2 detects the presence of a target object 5, in this case a target vehicle 5, on the road. In the example described, the computer 22 implements one or more methods for processing the images acquired by the camera 21 that allow light sources to be detected in these images, and thus the presence of the taillights 51 of the target vehicle 5 to be detected.

In a second step E2, the computer 22 determines a vertical angle α between the camera 21 of the host vehicle 1 and the taillights 51 of the target vehicle 5 and the distance $D_{HC}$ separating the camera 21 of the host vehicle from the taillights 51 of the target vehicle 5. In addition, the computer 22 classifies the type of the target vehicle among a set of predetermined vehicle types and determines, based on the type of the target vehicle 5 that has been selected, the height $H_C$ of the target vehicle 5. Each of these operations may be performed by one or more algorithms for processing the images acquired by the camera 21 and implemented by the computer 22. All of this information α, $D_{HC}$ and $H_C$ is transmitted by the computer 22 to the controller 4.

In a step E3, the controller 4 compares the value of the vertical angle α with a lower threshold $α_{min}$, for example −0.7°, and with an upper threshold $α_{max}$, for example +4.8°. If the angle α is not between $α_{min}$ and $α_{max}$, the method stops as it is possible to deduce that the host 1 and target 5 vehicles are traveling on a road whose slope does not allow or does not require a non-dazzling high-beam function. In the case that the vertical angle α is in between $α_{min}$ and $α_{max}$, the method moves on to the next step.

The vertical angle α that has been determined by the computer 22 relates to the position of the target vehicle 5 at the time t of acquisition by the camera 21 of the image that allowed it to be determined. However, both the various methods implemented by the computer 22 of the sensor system 2 and the steps of the method according to the invention which will be described below and which allow a non-dazzling high beam to be produced by the lighting system 3 require a given execution time ΔT after which the beam is actually emitted. During this time ΔT, the target vehicle 5 may have moved such that the value of the vertical angle α no longer corresponds to the actual position of the target vehicle 5 when the beam is emitted.

In order to compensate for this latency, in a step E4, the controller 4 predicts a value of a vertical angle α' between the camera 21 of the host vehicle 1 and the taillights 51 of the target vehicle at a future time t+Δt with respect to the time t of acquisition by the camera 21 of an image that allowed the vertical angle α to be determined in step E2. To those ends, the controller 4 determines a vertical angular velocity $\dot{θ}$ of the target vehicle by deriving the values from the various values of the vertical angle α determined previously in steps E2. The predicted value α' may thus be obtained using the following equation:

$$α' = α + \dot{θ} \cdot Δt \qquad \text{Math 3}$$

Where α is the value of the vertical angle at time t determined in step E2, α' the predicted value of the vertical angle at the future time t+Δt, $\dot{θ}$ the vertical angular velocity of the target vehicle 5 and Δt the latency time of the method according to the invention.

In a step E5, the controller 4 determines a lower angle $V_{inf}$ between the light module 31 and the taillights 51 of the target vehicle 5. The controller 4 thus transforms the predicted vertical angle α' by changing reference frame from a reference frame centered on the camera 21 of the sensor system 2 to a reference frame centered on the light module 31 of the lighting system 3 of the host vehicle, using the following equation:

$$V_{inf} = \tan^{-1}\left(\frac{\tan(α') \cdot D_{HC} \cdot \cos(α') + (H_{cam} - H_{HL})}{D_{HC} \cdot \cos(α') - D_{capot}}\right) \qquad \text{Math 4}$$

Where $V_{inf}$ is the lower angle, α' the value of the vertical angle predicted in step E4, $D_{HC}$ the distance separating the host vehicle 1 and the target vehicle 5 determined in step E2, $H_{cam}$ the height of the sensor system 2 of the host vehicle 1 with respect to the road, $H_{HL}$ the height of the lighting system 3 of the host vehicle 1 with respect to the road and $D_{capot}$ the distance separating the sensor system 2 from the lighting system 3.

The values $H_{cam}$, $H_{HL}$, and $D_{capot}$ are known in advance and stored in a memory of the controller 4.

Furthermore, still in step E5, the controller 4 determines an upper angle $V_{sup}$ from the value of the lower angle $V_{lower}$ obtained previously and the height of the target vehicle $H_C$ determined in step E2, for example using the following equation:

$$V_{sup} = \tan^{-1}\left(\frac{H_C - H_{HL})}{D_{HC} \cdot \cos(α') - D_{capot}}\right) + V_{inf} \qquad \text{Math 5}$$

Where $V_{sup}$ is the upper angle, α the value of the vertical angle predicted in step E4, $D_{HC}$ the distance separating the host vehicle 1 and the target vehicle 5 determined in step E2, $H_C$ the height of the target vehicle determined in step E2, $H_{HL}$ the height of the lighting system of the host vehicle with respect to the road, $V_{inf}$ the value of the lower angle and $D_{capot}$ the distance separating the sensor system 2 from the lighting system 3.

Upon completion of step E5, the controller 4 transmits the pair of lower $V_{inf}$ and upper $V_{sup}$ angles to the controller 34 of the light module 31. Furthermore, in steps that are not described, the controller 4 determines a pair of right $V_{LD}$ and left $V_{LG}$ lateral angles, respectively, from the positions of the taillights 51 of the target vehicle 5 and also transmits this pair of angles to the controller 34.

In a step E6, the controller 34 selects those elementary light sources $32_{i,j}$ of the light source 32 which are able to emit elementary light beams $HD_{i,j}$ whose emission cones are vertically at least partially between the lower $V_{inf}$ and upper $V_{sup}$ angles and horizontally at least partially between the right $V_{LD}$ and left $V_{LG}$ lateral angles. The controller 34 thus controls the turning off of these selected elementary light sources $32_{i,j}$ while controlling the turning on of the other elementary light sources. The light module 1 thus emits a pixelated high light beam HD in which is formed a dark region Zc centered on the target vehicle 5 and defined vertically by lower and upper cut-offs each forming a vertical angle with the light module 1, the respective values of which are substantially $V_{inf}$ and $V_{sup}$; and horizontally by right and left lateral cut-offs each forming a horizontal angle with the light module 1, the respective values of which are substantially $V_{LD}$ and $V_{LG}$. It will be noted that the term "substantially" should be interpreted here in relation to the vertical and horizontal resolutions of the pixelated light beam HD.

The preceding description clearly explains how the invention achieves the set objectives, in particular by providing a method for controlling a lighting system of a host vehicle that controls the turning on or the turning off of the elementary light sources of the lighting system so as to create a dark region in a pixelated light beam delimited by an upper cut-off and a lower cut-off, the positions of which are determined based on information from a sensor system of the host vehicle, and in particular relate to the vertical position of a target object on the road that should not be dazzled.

In any event, the invention should not be regarded as being limited to the embodiments specifically described in this document, and extends, in particular, to any equivalent means and to any technically operative combination of these means. In particular, it is possible to envisage other types of light module than that described, and in particular a light module comprising a combination of a light source and a matrix array of selectively activatable micromirrors. It will also be possible to envisage other methods for determining the various values used in the equations that allow the values of the lower and upper angles to be determined, or even equations other than those which have been described, and in particular equations integrating margins that allow the position of the upper and lower cut-offs of the dark region in the pixelated light beam to be moved vertically.

What is claimed is:

1. A method for controlling a lighting system of a host motor vehicle, the lighting system including a plurality of selectively controllable elementary light sources each able to emit an elementary light beam whose vertical angular aperture is smaller than 1°, the method comprising:
   detecting a target object with a sensor system of the host vehicle;
   determining, with a controller, a vertical angle between a given point of the sensor system of the host vehicle and a detected point of the target object;
   determining, from the vertical angle with the controller, a lower angle and an upper angle between a given point of the lighting system of the host vehicle and, an upper cut-off and a lower cut-off intended to together vertically border the target object; and
   controlling the elementary light sources, with an internal controller, of the lighting system of the host motor vehicle to emit a pixelated high light beam, some of the elementary light sources being controlled, as a function of the lower and upper angles, to generate, in the light beam, a dark region extending substantially between the upper and lower cut-offs.

2. The method as claimed in claim 1, wherein detecting the target object includes detecting a light source of the target object, with the detected point being a point of the light source.

3. The method as claimed in claim 1, wherein determining the lower and upper angles includes comparing the vertical angle with a lower threshold and an upper threshold.

4. The method as claimed in claim 1, wherein determining the vertical angle is the vertical angle at a given time, and further comprising predicting a value of the vertical angle at a future time with respect to the given time.

5. The method as claimed in claim 4, wherein the predicting a value includes determining a vertical angular velocity of the target object utilized to predict the value.

6. The method as claimed in claim 1, wherein the determining a vertical angle includes determining the distance separating the host vehicle and the target object, with the value of the lower angle being responsive to the determined distance.

7. The method as claimed in claim 1, wherein determining the vertical angle includes determining a height of the target object, with the upper angle being responsive to the lower angle and the height.

8. The method as claimed in claim 1, wherein the detecting the target object includes classifying the type of the target object among a set of predetermined target object types, and wherein a height of the target object is determined as a function of the classified target object type.

9. The method as claimed in claim 1, wherein the controlling the elementary light sources of the lighting system of the host vehicle includes turning off some elementary light sources each capable of emitting an elementary light beam between the upper and lower cut-offs.

10. A motor vehicle including a sensor system, a lighting system and a controller, wherein the controller being configured to implement a method for controlling the lighting system of the motor vehicle, the method comprising:
    detecting a target object with the sensor system;
    determining a vertical angle between a given point of the sensor system and a detected point of the target object;
    determining, from the vertical angle, a lower angle and an upper angle between a given point of the lighting system of the host vehicle and, an upper cut-off and a lower cut-off intended to together vertically border the target object; and
    controlling elementary light sources, with an internal controller, of the lighting system to emit a pixelated high light beam, some of the elementary light sources being controlled, as a function of the lower and upper angles, to generate, in the light beam, a dark region extending substantially between the upper and lower cut-offs.

* * * * *